United States Patent [19]

Hanson et al.

[11] 4,126,037
[45] Nov. 21, 1978

[54] COMPRESSION TEST USING BATTERY VOLTAGE WAVEFORM DURING CRANKING

[75] Inventors: Richard E. Hanson, Winchester; Ronald E. Tetrev, Westford, both of Mass.

[73] Assignee: RCA Corporation, New York, N.Y.

[21] Appl. No.: 852,562

[22] Filed: Nov. 17, 1977

[51] Int. Cl.$^2$ ............................................. G01M 15/00
[52] U.S. Cl. ..................................................... 73/116
[58] Field of Search ....................... 73/116, 115, 117.2

[56] References Cited

U.S. PATENT DOCUMENTS

| | | | |
|---|---|---|---|
| 3,765,233 | 10/1973 | Germann | 73/117.2 |
| 4,027,532 | 6/1977 | Trussell et al. | 73/117.2 |
| 4,050,296 | 9/1977 | Benedict | 73/116 |

Primary Examiner—Jerry W. Myracle
Attorney, Agent, or Firm—H. Christoffersen; Samuel Cohen; Carl V. Olson

[57] ABSTRACT

The compression in the cylinders of an internal combustion engine is tested by analyzing the battery voltage waveform when the engine is cranked by the starter motor with ignition or fuel inhibited. The detected voltage waveform is amplified in a manner to emphasize the a-c component having cycles between positive voltage peaks, each cycle having a negative voltage peak due to a compression stroke. A missing negative voltage peak indicates a very low compression in one cylinder. The voltage cycles are integrated and the integrals are compared to detect compression imbalance. The base level of each integration is made equal to the level of an adjacent positive voltage peak.

15 Claims, 4 Drawing Figures

COMPRESSION TEST USING BATTERY VOLTAGE WAVEFORM DURING CRANKING

The Government has rights in this invention pursuant to Contract No. DAAE 07-76-C-0068 awarded by the Department of the Army.

This invention relates to testing of compression in cylinders of internal combustion engines by detecting and evaluating the electrical conditions in the starter motor circuit when the engine is cranked with the ignition or fuel inhibited.

It is known to test compression by measuring the current drawn by the electric starter motor while cranking the engine with ignition or fuel inhibited. See U.S. Pat. No. 3,839,906 issued on Oct. 8, 1974, to R. E. Hanson on an "Apparatus For Engine Compression Testing;" and U.S. Pat. No. 3,765,233 issued on Oct. 16, 1973, to R. Germann on a "Device For Measuring Compression of Piston Engines;" and U.S. Pat. No. 3,952,586 issued on Apr. 27, 1976, to R. E. Hanson et al. on "Determining Engine Compression From Starter Motor Current."

To obtain the waveform of the current supplied to the electric starter motor it is necessary to connect a voltmeter across a low-resistance shunt built into the electrical system of the vehicle, or to employ a clamp-on current probe and clamp the probe onto a cable carrying electrical current to the starter motor. Suitable shunts are normally not provided in vehicles and they are time-consuming to install, and clamp-on current probes are expensive and awkward to use.

According to an example of the present invention, testing of compression is more conveniently accomplished by simply connecting test equipment across the terminals of the vehicle battery, and evaluating the changes in battery voltage as the engine is cranked with ignition or fuel inhibited.

Figure 1:
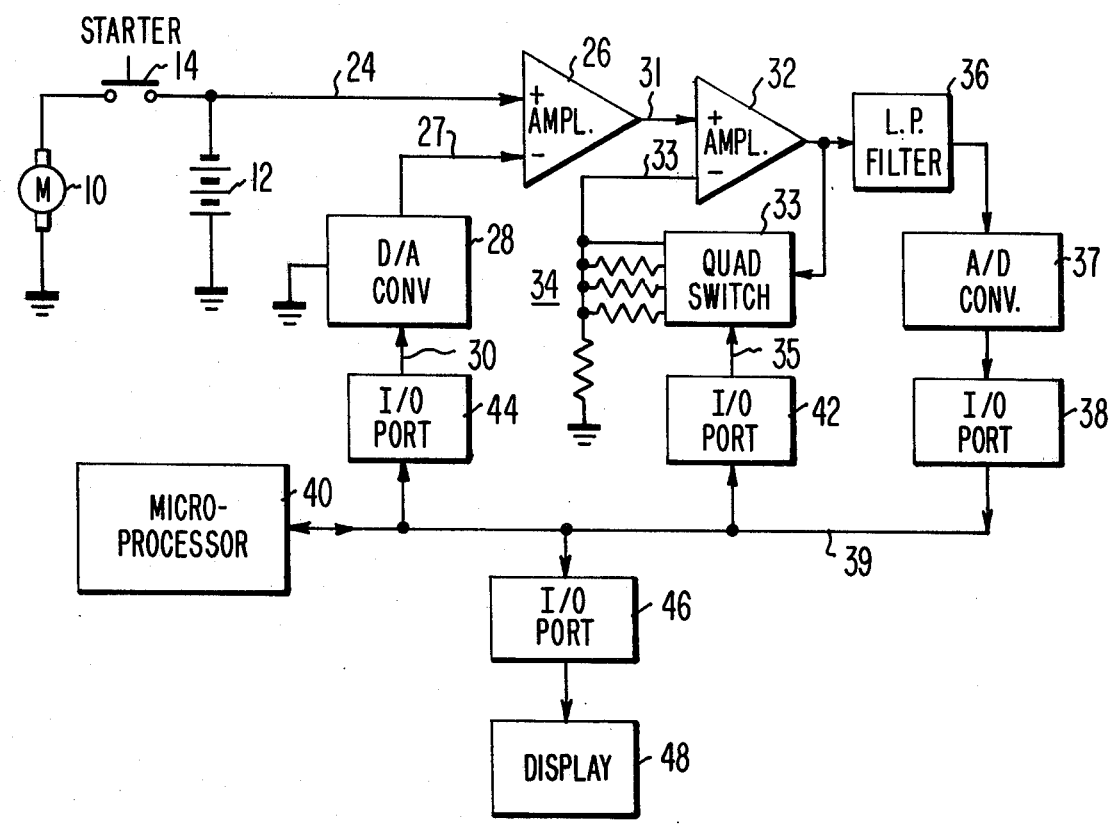
FIG. 1 is a schematic diagram of test equipment constructed according to the teachings of this invention, and showing also the manner of its connection with the starter motor circuit of an engine.
Figure 2:
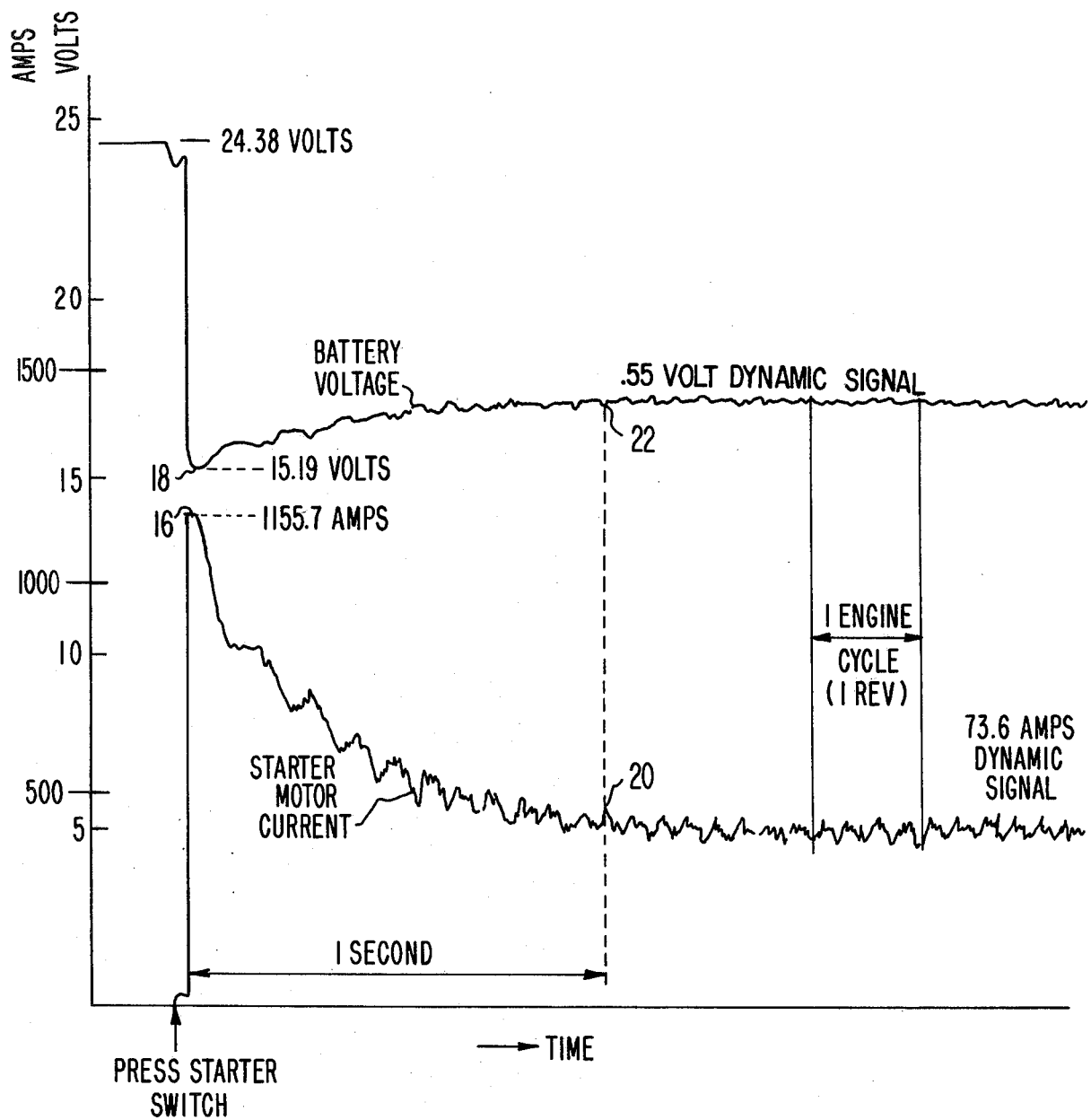
FIG. 2 is a chart of battery voltage and starter motor current waveforms measured in the starter motor circuit of a specific engine.

Referring now in greater detail to FIG. 1, an electric starter motor 10 of an internal combustion engine (not shown) is supplied with an electric current from a battery 12 when a starter motor switch 14 is closed. The current flowing through the motor 10 and the voltage across the battery 12 may vary as shown in FIG. 2. The motor current waveform rises sharply from zero to a high narrow peak 16 immediately after the starter switch is closed. At the same time, the voltage across the battery falls sharply to a negative-going voltage peak at 18. After about one second, the current falls back to a lower level 20, and the battery voltage rises to a higher level 22, as the engine having ignition or fuel inhibited is cranked by the starter motor.

The voltage across the battery 12 in FIG. 1 is connected over line 24 to the plus (+) input of a differential amplifier 26 which may be a type LM239 differential amplifier manufactured by National Semi-conductor Co. A reference potential such as ground potential is normally supplied over line 27 to the minus (−) input of amplifier 26 by a digital-to-analog converter 28 which may be a type AD7520JN 8-bit converter manufactured by Analog Devices, Inc. The converter supplies a different base-level potential to amplifier 26 when the converter receives a corresponding digital signal input on multi-conductor line 30.

The output of amplifier 26 is applied over line 31 to the plus (+) input of a programmable-gain amplifier which includes a differential amplifier 32, which may be a type LM239 amplifier manufactured by National Semi-conductor Co. The programmable gain amplifier also includes a quad switch 33, which may be an RCA type CD4052B unit, connecting any one of four resistors 34 having values of 0, 90K, 290K and 590K into the feedback path of amplifier 32. The amplifier 32 provides a gain of 1, 10, 30 or 60 depending on the digital signal applied to the quad switch 33 over multi-conductor line 35.

The output of amplifier 32 may be passed through a low-pass filter 36 which passes frequencies below about 60 Hz. The filter may be a conventional analog filter contructed of resistors and capacitors. The output of filter 36 is connected to the input of an analog-to-digital converter 37 which may be a type ADC80AG-12 12-bit converter manufactured by Analog Devices, Inc.

The output of converter 37 is connected through an I/O port 38 and over an 8-bit I/O bus 39 to a microprocessor 40. The I/O port 38 may consist of two type CDP1852 8-bit input-output ports manufactured by RCA Corporation, and the microprocessor 40 may be a type CDP1802CD microprocessor manufactured by RCA Corporation. The microprocessor 40 is connected by bus 39 with I/O ports 42, 44, and 46 each of which may be a type CDP1852 port. The port 46 is connected to a display device 48 which may be a four-digit alpha-numeric display consisting of four type D1P1052 7-segment incandescent display units manufactured by Pinlight Company.

In the operation of the compression testing apparatus of FIG. 1, the ignition or fuel to the engine is inhibited by means not shown and then the starter switch 14 is closed to cause the electric starter motor 10 to crank the engine. The voltage across the battery 12 has an initial sharp drop to negative-going peak 18 in FIG. 2 and then a gradual rise after about 1 second to a level 22. The voltage across the battery is applied to the plus (+) input of differential amplifier 26. The negative or reference input of amplifier 26 is supplied over line 27 with a zero or ground reference voltage from the digital-to-analog converter 28.

The output of amplifier 26 is coupled to the plus (+) input of amplifier 32 having a reference input from quad switch 33 and one of the resistors 34, so that the amplifier 32 has a minimum gain of 1. The output of amplifier 32 is passed through the low-pass filter 36 to the analog-to-digital converter 37 which produces a digital sample, every 2 milliseconds, of the voltage from amplifier 32. Starting at a time 1 second after the closing of starter switch 14, the digital samples are applied through input-output port 38 and over bus 39 to the microprocessor 40, and are stored in the microprocessor memory.

The port 42 provides a path for control signals from processor 40 over bus 39 to the quad switch 33. The port 44 provides a path for control signals from processor 40 over bus 39 to the digital-to-analog converter 28 which sets the threshold for amplifier 26.

As the digital samples of battery voltage are stored in the microprocessor memory, the program in the microprocessor causes the execution of a running average routine which acts as a digital filter to eliminate undesired noise from the stored digital samples of the battery voltage.

Figure 3:
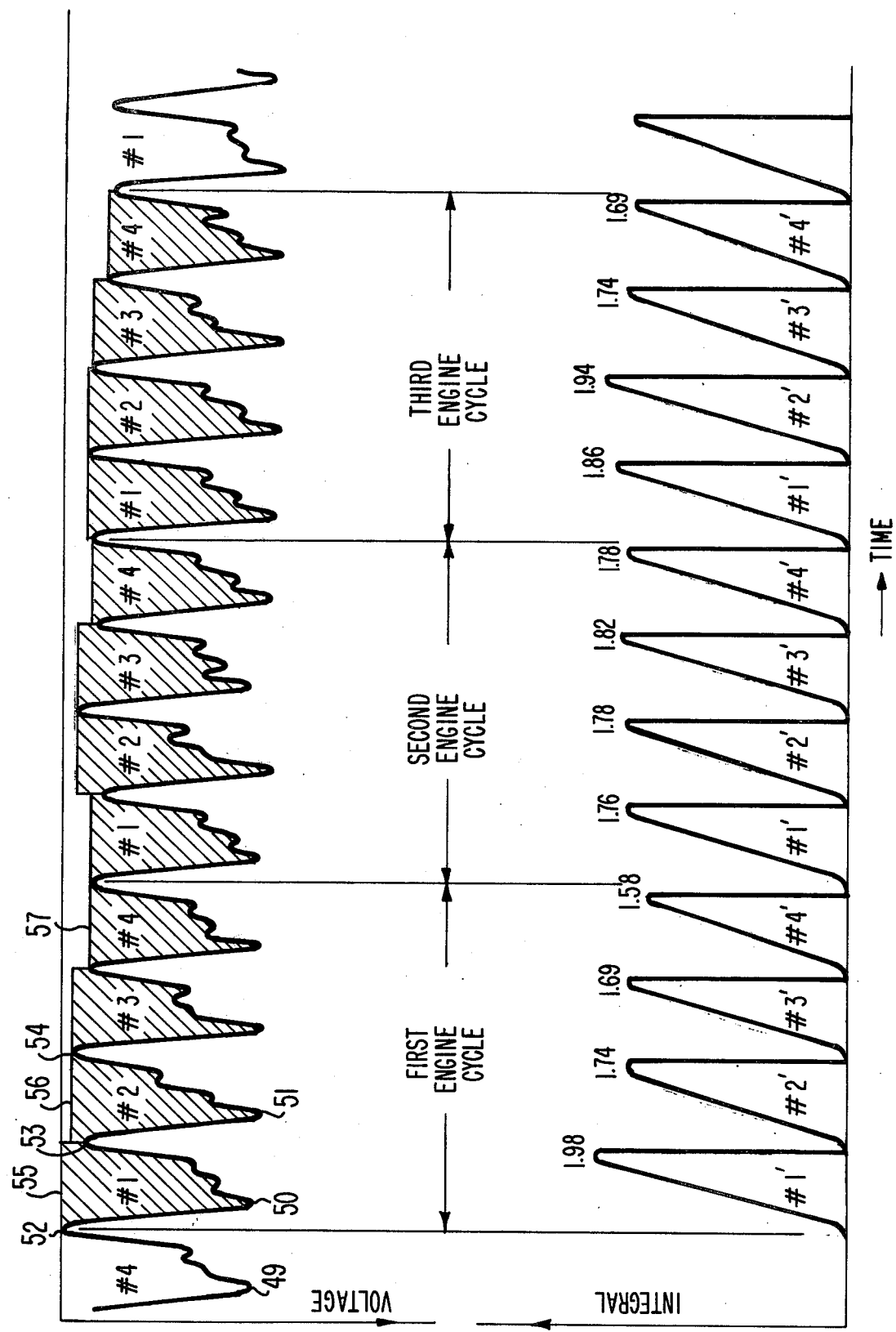
FIG. 3 is a chart of a battery voltage waveform, and an integrated battery voltage waveform, such as may be present in the apparatus of FIG. 1 during an engine compression test.

The stored digital samples may vary as shown in FIG. 3 which represents results obtained when testing an eight-cylinder engine having closely-spaced pairs of compression strokes, so that the battery voltage waveform has four negative-going peaks representing four compression peaks.

The microprocessor program compares the digital samples and determines the ones which represent negative-going voltage peaks, as at 49, 50 and 51, and determines the ones which represent positive-going voltage peaks, as at 52, 53 and 54. During the time of compression cycle #1, the program determines that the voltage peak 52 is higher than the voltage peak 53, and the microprocessor sends a digital signal through the I/O port 44 and the D/A converter 28 which sets the threshold of amplifier 26 to the level 55 of the highest adjacent peak 52. Similarly, during the time of compression stroke #2, the program determines that the voltage peak 54 is higher than voltage peak 53 and the microprocessor sends a digital signal to the D/A converter 28 which sets the threshold of amplifier 26 to the level 56 of the highest adjacent peak 54. This process is repeated so that the base levels from which the negative-going voltage cycles extend is varied in such a way as to avoid perturbations due to the running down of the battery voltage during engine cranking, and due to engine loping effects during which very minor compression faults may cause the system to miss voltage peaks.

The base levels 55, 56, 57, etc., in FIG. 3, thus established serve also to eliminate the direct-current component in the voltage waveform shown in FIG. 2, where the d-c component is seen to be about 17.5 volts. The program also determines the voltage differences between the positive voltage peaks 52, 53, 54, etc., and the negative voltage peaks 49, 50 and 51, etc., and the microprocessor sends a digital command through I/O port 42 to the quad switch 33 to cause an increase in the gain of amplifier 32 from a value of 1 to a value of 10, 30, or 60, as may be necessary to sufficiently amplify the rather small variations (such as 0.55 volts) in the peak-to-peak voltages of the battery voltage a-c waveform.

The program also determines the time intervals between positive voltage peaks 52, 53, 54, etc., and by simple subtraction compares each time interval with the preceding time interval. If a time interval between detected voltage peaks is either less than half, or more than twice, the preceding time interval, a voltage peak is missing, indicating an excessively low compression in at least one cylinder of the engine, and the microprocessor transmits a FAIL message through I/O port 46 to the display unit 48. It is this comparison of time intervals that allows the compression test system to operate without the need to install, or connect to, an engine tachometer or engine position indicating means.

In the absence of a failure indication from the comparison of time intervals, the next step in the testing is to perform an integration of the areas under each of the negative-going voltage cycles shown as shaded areas #1, #2, #3 and #4 in FIG. 3, to produce the integration curves labeled #1', #2', #3' and #4'. The integration of each negative-going voltage cycle is accomplished by the program by simply adding the values of the stored digital samples of the battery voltage in the interval between two previously-determined voltage peaks and dividing by a suitable divisor or scale factor. The integrals of the negative-going voltage cycles in FIG. 3 have relative values indicated by the numbers above the integral peaks. The cylinder pair having the largest integral is compared with the cylinder pair having the smallest integral to determine whether the compression in the worst pair of cylinders is significantly less than the compression in the best pair of cylinders. The microprocessor 40 causes the result of the comparison to be displayed by the display device 48.

In the past, compression balance tests have simply relied on the difference between the highest current or integral peak and the lowest current or integral peak. However, one peak may be unusually low because of a momentary poor seating of a valve, and this can result in a conclusion that the cylinder had poorer than actual compression. The testing of cylinder compression with a pressure gage provides a compression reading which is the highest value over many compression strokes. The most reliable measure of compression imbalance is obtained in the present system by selecting the highest integral over at least three engine cycles, of each of cylinder pair #1, cylinder pair #2, cylinder pair #3 and cylinder pair #4. Then the selected integral of the cylinder pair having the lowest integral is subtracted from the selected integral of the cylinder pair having the highest integral to provide a measure of compression imbalance.

In the example of operation shown in FIG. 3, the integral values are as shown in Table I.

TABLE I

| ENGINES | INTEGRALS FOR CYLINDER PAIRS | | | |
|---------|------|------|------|------|
| CYCLES | #1 | #2 | #3 | #4 |
| Cycle 1 | 1.98 | 1.74 | 1.69 | 1.58 |
| Cycle 2 | 1.76 | 1.78 | 1.82 | 1.78 |
| Cycle 3 | 1.86 | 1.94 | 1.74 | 1.69 |
| Selected | 1.98 | 1.94 | 1.82 | 1.78 |
|  | (Largest) |  |  | (Smallest) |

It is seen from Table I that the selected highest integral for cylinder pair #1 occurs in engine cycle 1, the highest for pair #2 is in cycle 3, the highest for pair #3 is in cycle 2, and the highest for pair #4 is in cycle 2. Of these selected values, cylinder pair #1 has the highest value and cylinder pair #4 has the smallest value. The percentage imbalance of the engine is computed by the microprocessor to be:

$$\frac{\text{largest integral} - \text{smallest integral}}{\text{largest integral}} \times 1/2 \times 100 =$$
$$\frac{1.98 - 1.78}{1.98} \times 1/2 \times 100 = 5\%$$

where the ½ is a scale factor introduced to make the calculated percentage figure comparable with percentage compression imbalance figures obtained by conventional prior art means. The result of 5 percent is transmitted by the microprocessor 40 in FIG. 1 through the I/O port 46 to the display unit 48 where the result of the compression balance test is displayed.

The 5 percent imbalance figure obtained in the example is considered to represent satisfactory compression balance in the engine tested. Figures of 15 percent and greater are considered unsatisfactory. However, the operator can adopt any appropriate figure to represent the dividing line between satisfactory and unsatisfactory compression balance.

The foregoing example describes the testing of an engine in which pairs of cylinders have compression strokes closely spaced in time so that the battery voltage waveform shows negative-going cycles for pairs of cylinders, rather than individual cylinders. The testing of engines in which compression strokes of individual cylinders are spaced in time is accomplished in the same manner. In this case the negative-going cycles each represent compression in an individual respective cylinder.

Figure 4:
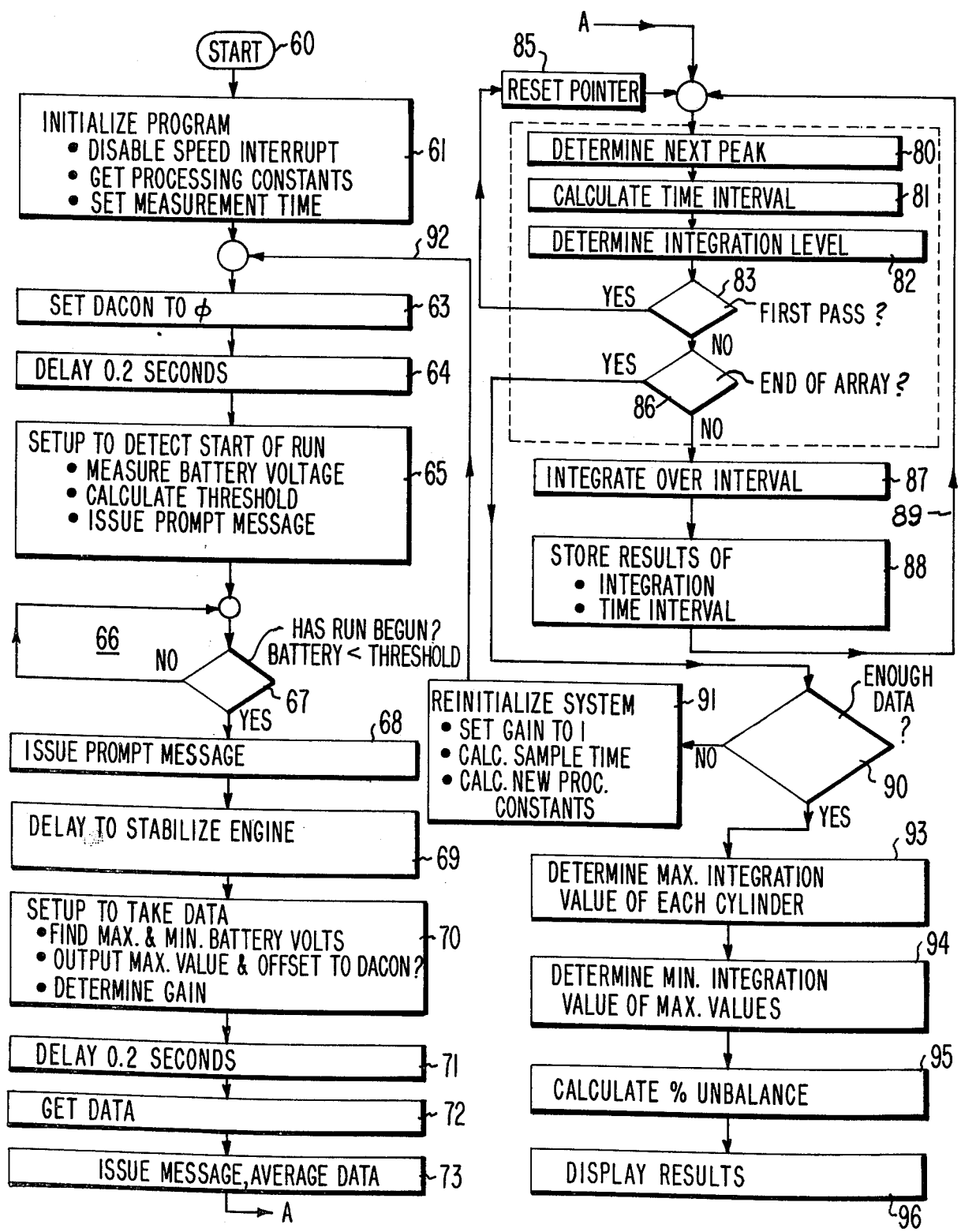
FIG. 4 is a flow chart of a computer program useful in the microprocessor in FIG. 1.

The part played in the described operation of the system of the invention by the program in the microprocessor 40 may, for example, be as illustrated in flow chart form in FIG. 4. If the microprocessor 40 is an RCA type CDP1802CD microprocessor, the program listing in hexi-decimal machine language shown in Table II may be used in the microprocessor to control the operation of the system. Each number in the leftmost column represents a memory address, and the eight numbers following each address represents the contents of that address and immediately following addresses.

TABLE II

| | | | | | | | | |
|---|---|---|---|---|---|---|---|---|
| 13DF | 02; | | | | | | | |
| 13E0 | 0000 | 3E00 | 0300 | 3004 | 6405 | 14D4 | 02B0 | 0020; |
| 13F0 | F800 | 73D4 | 0B27 | 0E47 | 7347 | 7307 | 73F8 | 00BE; |
| 1400 | F801 | AE92 | BB82 | ABD4 | 0293 | 13DF | D409 | CC10; |
| 1410 | 39D4 | 0C19 | D405 | 3E13 | E1F8 | 40BD | E87E | AD89; |
| 1420 | 5D2D | 995D | D403 | 00E4 | 9EF8 | 0BBD | F8BE | ADDD; |
| 1430 | 6060 | 9AB9 | 8AA9 | D407 | 7040 | 7D3D | 29D4 | 0300; |
| 1440 | EEEE | D402 | 4E04 | D409 | CCA2 | B5D4 | 09CC | A2B5; |
| 1450 | F840 | BDF8 | 6DAD | 0DF9 | 0C5D | D40C | 00FD | 07F8; |
| 1460 | 40BD | F874 | AD4D | B90D | A92D | F800 | A8B8 | D405; |
| 1470 | B313 | E3F8 | 40B7 | F87E | A789 | 5727 | 99FC | 0257; |
| 1480 | D402 | 974D | B90D | A9D4 | 053E | 4076 | 99CA | 16B3; |
| 1490 | 89FA | F03A | A2D4 | 0219 | 0189 | FA08 | 3AA2 | D402; |
| 14A0 | 1902 | D409 | CC10 | 39F8 | 03BD | F820 | ADF8 | BEAC; |
| 14B0 | F80B | BCF8 | 00A7 | B7A8 | F880 | B88D | 3AC1 | 9D32; |
| 14C0 | EFDC | 6087 | 529A | FC08 | BA8A | F597 | 529A | 7533; |
| 14D0 | D79A | B78A | A730 | E588 | 528A | F798 | 529A | 7733; |
| 14E0 | E59A | B88A | A82D | 9EBA | 8EAA | D409 | D930 | BB88; |
| 14F0 | 5287 | F798 | 5297 | 77CA | 16B3 | 87FB | FFAC | D403; |
| 1500 | 00F9 | 339B | BE8B | AEF8 | 03BD | F820 | AD8D | 3A13; |
| 1510 | 9D32 | 1C0E | 528C | F45E | 2E2D | 300D | 9BBE | 8BAE; |
| 1520 | 1E4E | AF4E | BF0E | BCF8 | 2052 | 9CF5 | ADF8 | 03BD; |
| 1530 | 1D9B | BE8B | AE9E | B78E | A79C | ACF8 | 00B9 | A9B8; |
| 1540 | A889 | 5207 | 27F4 | A93B | 4D99 | FC01 | B92C | 8C3A; |
| 1550 | 41F8 | 40B7 | F87E | A79C | 5727 | F800 | 57D4 | 05B7; |
| 1560 | 895E | 2E2D | 9D3A | 358D | 3A35 | 1E9B | BCBD | 8BAC; |
| 1570 | ADF8 | 00A8 | B830 | 7F97 | BC87 | AC98 | FC01 | B8D4; |
| 1580 | 178D | C015 | 77C0 | 15BC | F800 | B9A9 | 98FC | 01B8; |
| 1590 | 8C52 | 87F5 | 3A9C | 9C52 | 97F5 | 32AB | 8852 | 0CF5; |
| 15A0 | 5289 | F4A9 | 997C | 00B9 | 2C30 | 9089 | 5D2D | 995D; |
| 15B0 | 2DF8 | 40B7 | F880 | A707 | 5D2D | 307F | F800 | 5717; |
| 15C0 | 98C2 | 16B3 | FF01 | A957 | 17F8 | 0057 | 17B8 | A8B9; |
| 15D0 | F840 | BFF8 | 78AF | 0F57 | 27D4 | 05B7 | 99CA | 16B3; |
| 15E0 | 89FF | 02C3 | 1658 | D402 | 1900 | 1707 | FEA9 | D405; |
| 15F0 | 6013 | E9D4 | 05B3 | 407D | 99BF | 89AF | D405 | 3E13; |
| 1600 | E7F8 | 00B8 | A8D4 | 05B3 | 13E5 | 99BE | 89AE | F843; |
| 1610 | B2F8 | FFA2 | 02CA | 16AB | F801 | 739F | B98F | A9F8; |
| 1620 | 00B8 | A8D4 | 05B3 | 1656 | F840 | B7F8 | 7EA7 | 8957; |
| 1630 | 2799 | 57D4 | 0B27 | 0E97 | BD87 | ADF8 | 03AF | F800; |
| 1640 | A8B8 | B94D | A9D4 | 05B3 | 407D | 89C6 | F801 | 732F; |
| 1650 | 8F3A | 3EC0 | 1407 | 03E8 | 9BBC | 8BAC | 2C2C | 2707; |
| 1660 | A8B8 | 280C | 522C | 2C2C | 280C | F5CF | 0C52 | 883A; |
| 1670 | 6522 | 98A8 | 9BBC | 8BAC | 2C2C | 280C | 522C | 2C2C; |
| 1680 | 280C | F5C7 | 0C52 | 883A | 7D72 | AEF0 | A9F8 | 00B9; |
| 1690 | A8B8 | D405 | 6018 | 8EF8 | 7EA7 | F840 | B78E | 5727; |
| 16A0 | F800 | 57D4 | 05B7 | 89FF | 123B | BBD4 | 0300 | 3068; |
| 16B0 | C017 | 89D4 | 030C | E013 | C017 | 89D4 | 40B7 | F878; |
| 16C0 | A707 | BEAE | 52F4 | F4BF | 9BBC | 8BAC | F840 | B7F8; |
| 16D0 | 7EA7 | 0C57 | 2C27 | 0C57 | 1C8C | 529F | F5AD | 9C7F; |
| 16E0 | 00BD | 0DA9 | 2D0D | B91D | D407 | 74F5 | ED0D | 5C2D; |
| 16F0 | 2C0D | 5C1D | 1C2C | 2C2C | 2E8E | 3ACC | 9BBC | 8BAC; |
| 1700 | 9EAE | F840 | B7F8 | 7EA7 | 0C57 | 1717 | 5727 | 2C0C; |
| 1710 | 5727 | 2757 | 2C2C | 2E8E | C217 | 48F8 | 40B7 | F87D; |
| 1720 | A70C | A92C | 0CB9 | D407 | 7434 | 2D30 | 344C | 5717; |
| 1730 | 0C57 | 2C27 | 1717 | D407 | 743D | 4330 | 434C | 5717; |
| 1740 | 0C57 | 2C2C | 2CC0 | 1716 | F840 | B7F8 | 7DA7 | 47B9; |
| 1750 | 07A9 | D405 | 600F | F9D4 | 05B3 | 407F | D404 | 1727; |
| 1760 | 2799 | 5717 | 8957 | D403 | 62D4 | 09CC | A2B5 | D40B; |
| 1770 | 270E | 1717 | 17D4 | 04C6 | 99FE | F800 | C7F8 | FFB8; |
| 1780 | A8D4 | 05B3 | 188E | D403 | 62D4 | 028B | 2398 | 739C; |
| 1790 | 738C | 73F8 | 0073 | F840 | B7F8 | 75A7 | 0C57 | 27F8; |
| 17A0 | 0057 | 2C9C | BA8C | AA9F | 528F | F4FE | 528C | F7AB; |
| 17B0 | 9C7F | 00BB | 9BB9 | 8BA9 | F840 | B7F8 | 7EA7 | 8E57; |
| 17C0 | 279E | 57D4 | 0074 | CACD | 30CD | C018 | 7FF8 | 00A9; |
| 17D0 | B98F | BF9A | BD8A | AD0D | 2D52 | 89F4 | A999 | 7C00; |
| 17E0 | B99F | FF01 | BF3A | D78F | BF9B | BD8B | AD0D | 1D52; |
| 17F0 | 89F7 | A999 | 7F00 | B99F | FF01 | BF3A | ED99 | FE3B; |
| 1800 | 0812 | F801 | 73C0 | 180D | 1202 | 223A | 122A | 2BC0; |
| 1810 | 17B4 | 12F8 | 0073 | 9ABD | 8AAD | F840 | B7F8 | 7EA7; |
| 1820 | 0D57 | 27F8 | 0057 | 2D8B | 528D | F5C2 | 1850 | F800; |
| 1830 | B90D | A9D4 | 0774 | 3A41 | 3041 | 12F8 | 0073 | C018; |
| 1840 | 2612 | F801 | 7317 | 8957 | 279D | BF8D | AFC0 | 1826; |
| 1850 | 1202 | 733A | 7FF8 | 00B9 | 0FA9 | D407 | 7040 | 7465; |
| 1860 | 610F | A830 | 6817 | 07A8 | F840 | B7F8 | 80A7 | 1212; |
| 1870 | 8FF5 | 5712 | 129F | B78F | A702 | B832 | 8D30 | 8712; |

TABLE II-continued

| 1880 | 1212 | 1202 | B830 | 8A16 | 1616 | 1616 | 16D5 | 00A |
|------|------|------|------|------|------|------|------|-----|

Referring now to the flow chart of FIG. 4, the left half of the chart describes the gathering and storing of data for use in subsequent processing by the microprocessor 40. The microprocessor used in the example herein is incapable of the performing compression balance test in real time, and it is necessary for the system to gather data and store it for processing. After the start 60, the program initialization at 61 consists of three steps: (1) Disable all unwanted interrupts during performance of the compression balance algorithm. (2) Get processing constants peculiar to the particular engine being tested. These constants are determined in an earlier phase by engineering personnel and are stored in the microprocessor. (3) Set measurement time, which is the time interval between digital samples of the analog voltage waveforms, the interval being appropriate to the particular engine being tested.

In step 63, the DACON (D/A converter) is set to zero to insure that just the voltage of the battery is measured, since later on it is used to offset the incoming waveform. Step 64, Delay 0.2 seconds, is a delay inserted to allow the electronic circuits to stabilize because of setting the DACON to zero.

The section 65 of the program, Setup to Detect Start of Run, is used to detect when the operator has started cranking the engine so that the program will know when to take compression data. This is done by measuring the battery voltage and calculating a threshold voltage which is typically equal to battery voltage minus 1 volt. The processor is now ready to take data and indicates so by displaying the prompt message "go," and then goes into a loop 66 waiting for the operator to start cranking the engine. When the battery voltage is less than the threshold voltage, the program takes step 68 which is the issuance of a message that the operator has started cranking the engine.

In step 69, Delay to Stabilize Engine, a 1-second delay, shown in FIG. 2, is introduced during engine cranking to allow the voltage waveform from the engine to stabilize.

In step 70, Set up to Take Data, the maximum and minimum battery voltages are analyzed, and a voltage offset is applied through D/A converter 28 to the reference input of amplifier 26, and a gain-setting signal is applied to quad switch 33 to set the gain of amplifier 32. Step 71, a delay of 0.2 seconds, is necessary to allow the adjusted hardware elements to stabilize. In step 72, Get Data, the system collects the data subject to all of the prior contraints. When the processor has the data, it takes the step 73 of issuing a message to stop cranking by displaying the message "OFF," and then the microprocessor performs the averaging of the collected data to smooth out the data and remove abrupt transient disturbances in the data.

In step 80, the value and storage location of the positive voltage peak 52 (FIG. 3) is determined. Steps 81, 82, and 83 are then gone through, and the pointer step 85, is reset. During the next traverse through the loop, the voltage peak 53 is determined, the time interval between peaks 52 and 53 is determined, and the integration level 55 is determined from the fact that peak 52 is higher than peak 53. The comparison step 83 then directs the program to comparison step 86 and on to the integration step 87 during which the shaded area in FIG. 3 between voltage peaks 52 and 53 is integrated. In step 88 the result of the integration and the time interval between peaks are stored.

The return path 89 is then followed to repeat the process for the #2 area between voltage peaks 53 and 54. The loop may be repeatedly gone through 12 times, according to the example in FIG. 3, after which the comparator step 86 directs the program to comparator step 90 to determine whether data has been collected for a sufficient number of compression cycles over at least two engine cycles. If not, the Reinitialize System step 91 is performed, as well as steps 63 through 73, to insure that a sufficient number of compression cycles will be processed when going a second time through steps 80 through 90.

When the output at 90 is yes, the program at 93 determines the maximum integration value for compression cycle #1, and also for compression cycles #2, #3 and #4. In step 94, the minimum integration value of the four selected values, and the maximum value of the four selected values, are determined. In step 95, the percentage difference between the minimum and maximum values are calculated to determine the extent of compression imbalance in the engine tested, and the result is displayed in step 96.

What is claimed is:

1. Compression testing apparatus for testing an internal combustion engine, comprising
   means for detecting the battery voltage waveform when the engine is cranked with the ignition or fuel inhibited, said voltage waveform having cycles between positive voltage peaks,
   amplifier means for amplifying the detected voltage waveform relative to a reference voltage,
   means to adjust said reference voltage to a value approximating the direct-current component of said voltage waveform, and
   means to increase the gain of said amplifier, whereby to increase the amplification of the alternating-current component of said voltage waveform, and
   means to compare the cycles of said amplified voltage waveform.

2. Apparatus to detect unsatisfactory compression in individual cylinders of an internal combustion engine having compression strokes, comprising
   means for detecting the battery voltage waveform when the engine is cranked with the ignition or fuel inhibited, said voltage waveform having cycles between positive voltage peaks, each cycle having a negative voltage peak due to compression strokes in at least one of the cylinders of the engine,
   means for generating cycle period signals representing the time periods between successive positive voltage peaks of said waveforms, and
   means for comparing each said cycle period signal with the preceding cycle period signal and producing a FAIL signal if the present signal is more than twice that of the preceding signal, whereby a FAIL signal is generated as the result of very low compression in one cylinder.

3. Apparatus according to claim 2 wherein said means for comparing cycle period signals also produces a FAIL signal if the present signal is less than one-half that of the preceding signal.

4. Apparatus according to claim 2, and in addition,
integrator means for integrating the area of each negative-going waveform cycle to produce corresponding integration signals, and
means for subtracting the amplitude of the smallest integration signal from the amplitude of the largest integration signal and producing a difference signal which is a measure of compression imbalance in the engine.

5. Apparatus according to claim 4, and in addition, means for setting the base level of an adjacent positive voltage peak of the voltage waveform.

6. Apparatus according to claim 4 wherein the base level of the integrator means is set at the level of the highest of the two adjacent positive voltage peaks.

7. Apparatus according to claim 2 wherein said means for detecting the starter motor voltage waveform includes means for amplifying the detected voltage waveform relative to a reference voltage, means to adjust said reference voltage to a value approximating the direct-current component of said voltage waveform, and means to increase the gain of said amplifier.

8. The method of performing a compression test of an internal combustion engine, comprising the steps of
detecting the battery voltage waveform when the engine is cranked with the ignition or fuel inhibited, said voltage waveform having cycles between positive voltage peaks,
amplifying the detected voltage waveform relative to a reference voltage,
adjusting said reference voltage to a value approximating the direct-current component of said voltage waveform,
increasing the gain of said amplifier, whereby to increase the amplification of the alternating-current component of said voltage waveform, and
comparing the cycles of said amplified voltage waveform.

9. The method of detecting unsatisfactory compression in individual cylinders of an internal combustion engine having compression strokes, comprising the steps of
detecting the battery voltage waveform when the engine is cranked with the ignition or fuel inhibited, said voltage waveform having cycles between positive voltage peaks, each cycle having a negative voltage peak due to compression strokes in at least one of the cylinders of the engine,
generating cycle period signals representing the time periods between successive positive voltage peaks of said waveform, and
comparing each said cycle period signal with the preceding cycle period signal and producing a FAIL signal if the present signal is more than twice, that of the preceding signal.

10. The method according to claim 9 and the additional step of producing a FAIL signal if the present signal is less than one-half that of the preceding signal.

11. The method according to claim 9 and in addition the steps of
integrating the area of each negative-going waveform cycle to produce corresponding integration signals, and
subtracting the amplitude of the smallest integration signal from the amplitude of the largest integration signal and producing a difference signal which is a measure of compression imbalance in the engine.

12. The method according to claim 11, and in addition the step of setting the base level of said integration at the level of an adjacent positive voltage peak of the voltage waveform.

13. The method according to claim 11, and in addition the step of setting the base level of said integration at the level of the highest of the two adjacent positive voltage peaks.

14. The method according to claim 9 wherein said step of detecting the battery voltage waveform includes the steps of amplifying the detected voltage waveform relative to a reference voltage, adjusting said reference voltage to a value approximating the direct-current component of said voltage waveform, and increasing the gain of said amplifier.

15. A method of testing the compression of the cylinders of an internal combustion engine of the type in which pairs of cylinders are operated in synchronism and which is started by a battery comprising the steps of:
producing a waveform representing the battery voltage when the engine is cranked but when the fuel is not permitted to ignite and with the waveform compensated to remove the effect of decreasing battery voltage during successive compression cycles, said waveform including successive peaks during each period, each such peak representing a different pair of cylinders;
integrating the area under each peak of said waveform for N successive periods, where N is an integer greater than 1;
selecting from the integrals for each pair of cylinders, the integral of greatest value for each pair of cylinders; and
comparing the selected integral of greatest value with the selected integral of lowest value to obtain a measure of the compression balance of the engine.

* * * * *